(12) United States Patent
Moroi et al.

(10) Patent No.: US 9,239,021 B2
(45) Date of Patent: Jan. 19, 2016

(54) INTERNAL COMBUSTION ENGINE WITH SUPERCHARGER

(75) Inventors: Takahiro Moroi, Kariya (JP); Kenta Akimoto, Kariya (JP); Manabu Ishikawa, Kariya (JP); Hisao Kobayashi, Kariya (JP); Hiroshi Uchida, Nagoya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 134 days.

(21) Appl. No.: 13/394,279

(22) PCT Filed: Sep. 7, 2010

(86) PCT No.: PCT/JP2010/065272
§ 371 (c)(1),
(2), (4) Date: Mar. 5, 2012

(87) PCT Pub. No.: WO2011/030739
PCT Pub. Date: Mar. 17, 2011

(65) Prior Publication Data
US 2012/0159948 A1    Jun. 28, 2012

(30) Foreign Application Priority Data

Sep. 8, 2009   (JP) .................................. 2009-206953
Sep. 3, 2010   (JP) .................................. 2010-197796

(51) Int. Cl.
F02D 23/02       (2006.01)
F02M 25/07       (2006.01)
F02B 37/02       (2006.01)

(52) U.S. Cl.
CPC ........... F02D 23/02 (2013.01); F02M 25/0713 (2013.01); F02M 25/0745 (2013.01);
(Continued)

(58) Field of Classification Search
USPC ......................... 60/605.2, 624; 701/105, 108; 123/568.12
See application file for complete search history.

(56) References Cited

U.S. PATENT DOCUMENTS 6,694,735 B2 *   2/2004   Sumser et al. ............... 60/605.2
6,899,090 B2 *   5/2005   Arnold ..................... 123/568.12
(Continued)

FOREIGN PATENT DOCUMENTS

CN             1910355 A         2/2007
DE       102005021172 A1        11/2006
(Continued)

OTHER PUBLICATIONS

English Machine Translation of JP 02001164934 A.*
(Continued)

*Primary Examiner* — Jorge Pereiro
*Assistant Examiner* — Paul Thiede
(74) *Attorney, Agent, or Firm* — Sughrue Mion, PLLC

(57) ABSTRACT

An internal combustion engine with a supercharger comprises an internal combustion engine including a plurality of cylinders; an intake passage that supplies gas to the internal combustion engine; a turbocharger-type supercharger including a turbine portion having a plurality of exhaust gas introduction passages; and an exhaust passage including a plurality of connecting passages that connect the plurality of cylinders and the plurality of exhaust gas introduction passages, wherein exhaust gas discharged from the internal combustion engine flows through the exhaust passage. The internal combustion engine comprises a bridge passage that connects two or more of the plurality of connecting passages to each other; a branch passage connected to the bridge passage; and a first opening and closing device provided into the bridge passage to open and close the bridge passage.

2 Claims, 8 Drawing Sheets

(52) U.S. Cl.
CPC ........... *F02B37/025* (2013.01); *F02M 25/0707* (2013.01); *F02M 25/0727* (2013.01); *Y02T 10/121* (2013.01); *Y02T 10/144* (2013.01)

(56) References Cited

U.S. PATENT DOCUMENTS

| | | | |
|---|---|---|---|
| 7,287,378 B2 * | 10/2007 | Chen et al. .................. | 60/605.2 |
| 2010/0024417 A1 * | 2/2010 | Pierpont ............... | F01N 13/107 |
| | | | 60/605.2 |

FOREIGN PATENT DOCUMENTS

| | | |
|---|---|---|
| DE | 102007036937 A1 | 2/2009 |
| EP | 2295769 A1 | 3/2011 |
| JP | 2001-164934 A | 6/2001 |
| JP | 2003-278540 A | 10/2003 |
| JP | 2006-250002 A | 9/2006 |
| JP | 2008-255940 A | 10/2008 |
| JP | 2008-303837 A | 12/2008 |
| JP | 2009-174364 A | 8/2009 |

OTHER PUBLICATIONS

English Machine Translation of JP 02008303837 A.*
Definition of 'exhaust-gas recirculation'. Webpage [online]. Dictionary.com [retrieved on Mar. 14, 2014]. Retrieved from the Internet: <URL: http://dictionary.reference.com/browse/exhaust-gas+recirculation?r=66>.*
English Translation of DE 10 2005 021 172 A1 is the translation of WO 2006/119866 A1 which is the same family as DE 10 2005 021 172 A1 (translation was generated on Jul. 26, 2015).*
Translation of International Preliminary Report on Patentability for corresponding International Patent Application No. PCT/JP2010/065272 issued on Apr. 11, 2012.
Chinese Office Action dated Feb. 8, 2014 issued in counterpart Chinese Patent Application No. 201080039172.X.
Communication dated May 4, 2015, issued by the European Patent Office in counterpart Application No. 10815336.2.

* cited by examiner

INTERNAL COMBUSTION ENGINE WITH SUPERCHARGER

CROSS REFERENCE TO RELATED APPLICATION

This application is a National Stage of International Application No. PCT/JP2010/065272, filed on Sep. 7, 2010, claiming priority based on Japanese Patent Application Nos. 2009-206953, filed Sep. 8, 2009 and JP 2010-197796, filed Sep. 3, 2010, the contents of all of which are incorporated herein by reference in their entirety.

FIELD OF THE INVENTION

The present invention relates to an internal combustion engine with a supercharger comprising a turbocharger-type supercharger including a turbine portion having a plurality of exhaust gas introduction passages, and an exhaust passage including a plurality of connecting passages that connect a plurality of cylinders and a plurality of exhaust gas introduction passages, wherein exhaust gas discharged from the internal combustion engine flows through the exhaust passage.

BACKGROUND OF THE INVENTION

Exhaust-driven turbocharger-type superchargers that perform supercharging using flow strength of an exhaust stream are frequently used as superchargers to improve the intake efficiency of an internal combustion engine. For example, see Patent Document 1. Patent Document 1 discloses an exhaust system in which two or more collecting tubes joining a plurality of exhaust passages, are connected with a bridge passage serving as a communication tube. The communication tube is adapted to be opened and closed by a valve. Patent Document 1 describes the communication tube as contributing to an improvement in thermal efficiency in an internal combustion engine. Patent Document 1 also describes that the internal diameter of the communication tube may be set to 20 to 100% of the internal diameter of each collecting tube to ensure the contribution to an improvement in thermal efficiency.

Patent Document 1: Japanese Laid-open Patent Publication No. 2001-164934

SUMMARY OF THE INVENTION

However, even in the case where a turbocharger-type supercharger is driven by using flow strength of exhaust gas to improve engine power, the pressure of the exhaust gas, i.e., the exhaust pressure should be set lower than the strength against exhaust pressure in exhaust system parts such as a sealing structure of an exhaust system. To set the exhaust pressure lower than the strength against the exhaust pressure in exhaust system parts, the internal diameter of the communication tube cannot be much smaller than the internal diameter of each collecting tube. Meanwhile, when the internal diameter of the communication tube is increased, the size of the valve for opening and closing the communication tube must be increased. For this reason, it is necessary to reduce the internal diameter of the communication tube so as to miniaturize the valve for opening and closing the communication tube. However, it is impossible for the exhaust system disclosed in Patent Document 1 to achieve both a reduction in the exhaust pressure to be lower than the strength against the exhaust pressure and a reduction in the internal diameter (passage sectional area) of the communication tube (bridge passage).

It is an object of the present invention to achieve an exhaust pressure smaller than the strength against exhaust pressure, and a smaller passage sectional area of a bridge passage.

In one aspect of the invention, an internal combustion engine with a supercharger comprising: an internal combustion engine including a plurality of cylinders; an intake passage that supplies gas to the internal combustion engine; a turbocharger-type supercharger including a turbine portion having a plurality of exhaust gas introduction passages; and an exhaust passage including a plurality of connecting passages that connect the plurality of cylinders and the plurality of exhaust gas introduction passages, wherein exhaust gas discharged from the internal combustion engine flows through the exhaust passage, is provided. The internal combustion engine comprises a bridge passage that connects two or more of the plurality of connecting passages to each other; a branch passage connected to the bridge passage; and a first opening and closing device provided into the bridge passage to open and close the bridge passage.

In one embodiment, the connecting passage includes a joining passage that joins the plurality of connecting passages that connects the plurality of cylinders.

In another embodiment, the branch passage serves as an EGR passage having one end connected to the bridge passage and the other end connected to the intake passage, and the internal combustion engine further comprises: a heat exchanger provided on the EGR passage to cool exhaust gas flowing through the EGR passage; and a second opening and closing device provided downstream of the heat exchanger in the EGR passage to open and close the EGR passage.

In another embodiment, the internal combustion engine further comprises a third opening and closing device that opens and closes the EGR passage upstream of the heat exchanger.

In another embodiment, the third opening and closing device is provided on the EGR passage upstream of the heat exchanger.

In another embodiment, the first opening and closing device and the third opening and closing device configure a single switch valve that switches communication and blocking between the EGR passage and the bridge passage upstream of the heat exchanger, and that switches opening and closing of the bridge passage, the EGR passage and the bridge passage are connected via the switch valve, and the EGR passage and the bridge passage are located upstream of the heat exchanger.

In another embodiment, the internal combustion engine comprises a rate-of-revolution detection device that detects the rate of revolution of the internal combustion engine; a load detection device that detects load of the internal combustion engine; and a control device that controls opening and closing of the second opening and closing device and the first opening and closing device, wherein the control device controls opening and closing of the first opening and closing device and the second opening and closing device in accordance with the rate of revolution detected by the rate-of-revolution detection device and the load detected by the load detection device.

In a further embodiment, the internal combustion engine comprises a rate-of-revolution detection device that detects the rate of revolution of the internal combustion engine; a load detection device that detects load of the internal combustion engine; and a control device that controls opening and closing of the second opening and closing device, the first opening and closing device, and the third opening and closing device, wherein the control device controls opening and closing of the first opening and closing device, the second opening and closing device, and the third opening and closing device in accordance with the rate of revolution detected by the rate-of-revolution detection device and the load detected by the load detection device.

In another embodiment, the control device opens all of the first opening and closing device, the second opening and closing device, and the third opening and closing device in a low load region, the control device closes all of the first opening and closing device, the second opening and closing device, and the third opening and closing device in a low-revolution-rate high-load region with a load higher than that of the low load region and with low revolution rate, the control device opens the first opening and closing device and closes the second opening and closing device and the third opening and closing device in an intermediate-revolution-rate high-load region with a load higher than that of the low load region and with a higher rate of revolution than that of the low-revolution-rate high-load region, and the control device opens the first opening and closing device and the third opening and closing device and closes the second opening and closing device in a high-revolution high-load region with a load higher than that of the low load region and with a higher rate of revolution than that of the intermediate-revolution-rate high-load region.

DETAILED DESCRIPTION OF THE PREFERRED EMBODIMENTS

A four-cylinder diesel engine of a first embodiment of the present invention will be described with reference to FIGS. 1 to 8.

Figure 1:
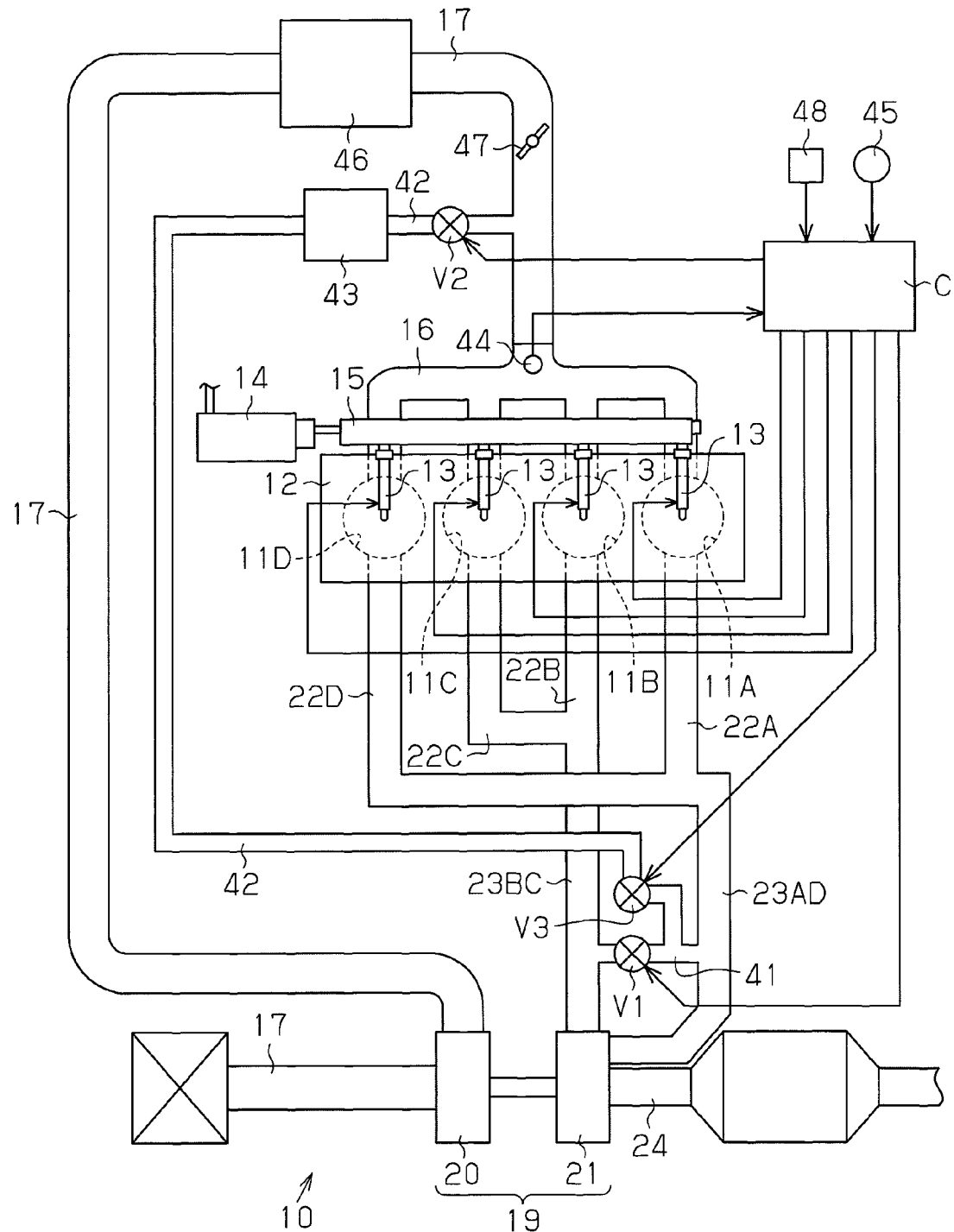
FIG. 1 is an overall structural view of an internal combustion engine illustrating a first embodiment.

As illustrated in FIG. 1, a diesel engine 10 serving as an internal combustion engine includes a plurality of cylinders 11A, 11B, 11C, and 11D each of which houses a non-illustrated piston. A cylinder head 12 is connected to a cylinder block (not illustrated) that forms the cylinders 11A, 11B, 11C, and 11D. Fuel injection nozzles 13 are attached to the cylinder head 12 to correspond to the cylinders 11A, 11B, 11C, and 11D. A light oil serving as fuel is supplied to the fuel injection nozzles 13 via a fuel pump 14 and a common rail 15. The fuel injection nozzles 13 inject the fuel into each of the cylinders 11A, 11B, 11C, and 11D.

An intake manifold 16 is connected with the cylinder head 12. An intake passage 17 is connected with the intake manifold 16. A compressor portion 20 of a turbocharger-type supercharger 19 is provided in the middle of the intake passage 17. The turbocharger-type supercharger 19 is a variable nozzle type supercharger that is activated by an exhaust gas stream. Air within the intake passage 17 on the upstream side of the compressor portion 20 of the turbocharger-type supercharger 19 is drawn in and fed from the compressor portion 20.

Exhaust passages 22A, 22B, 22C, and 22D are connected with the cylinder head 12. The exhaust passages 22A and 22D are merged and connected to a joining passage 23AD. The exhaust passages 22B and 22C are merged and connected to a joining passage 23BC. The joining passage 23AD and the joining passage 23BC are connected to a turbine portion 21 of the turbocharger-type supercharger 19. The exhaust passages 22A and 22D and the joining passage 23AD configure a first connecting passage connected to the turbine portion 21. The exhaust passages 22B and 22C and the joining passage 23BC configure a second connecting passage connected to the turbine portion 21. The first connecting passage and the second connecting passage configure an exhaust gas passage for guiding exhaust gas discharged from the diesel engine 10 to the turbine portion 21.

Exhaust gas discharged from the cylinders 11A and 11D is directed to the joining passage 23AD via the exhaust passages 22A and 22D, and exhaust gas discharged from the cylinders 11B and 11C is directed to the joining passage 23BC via the exhaust passages 22B and 22C. The exhaust gas directed from the joining passages 23AD and 23BC to the turbine portion 21 is discharged to the atmosphere via an exhaust passage 24.

Figure 2A:
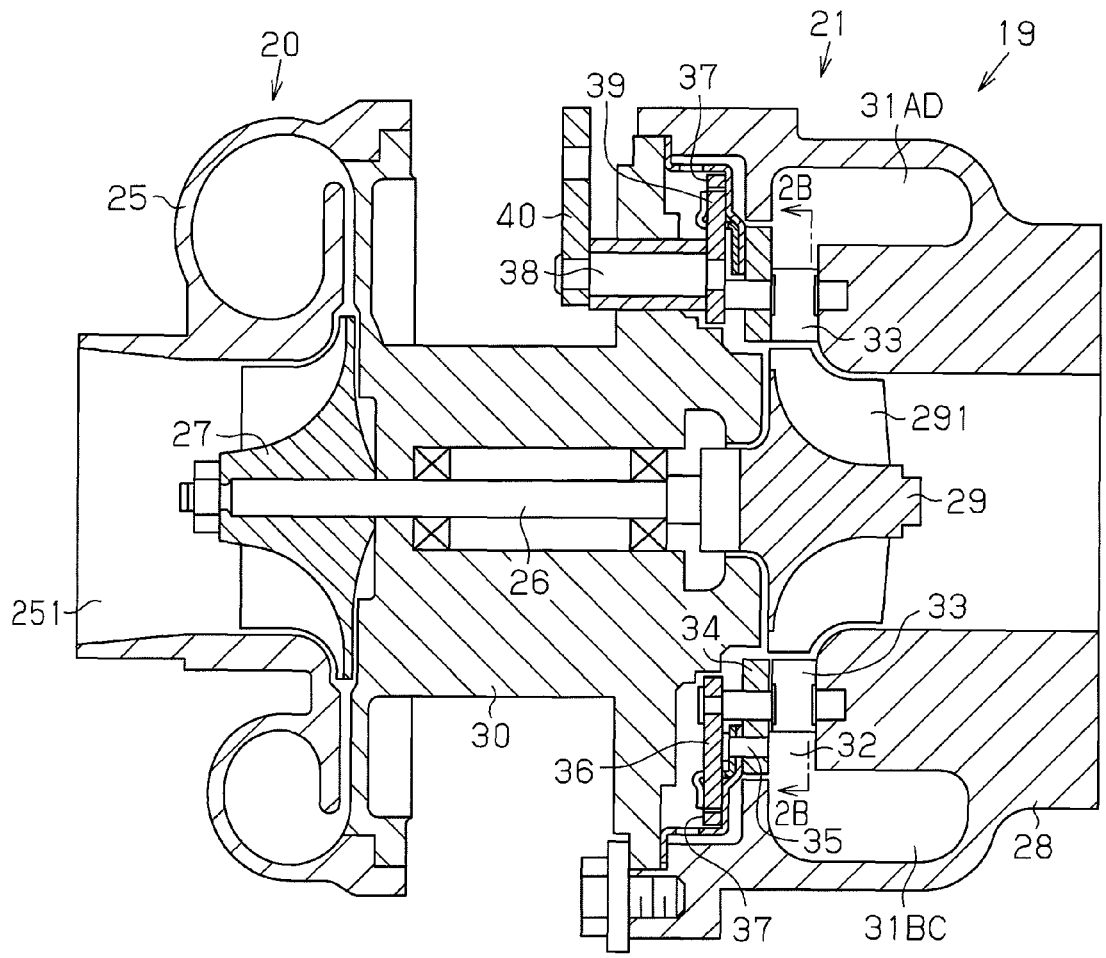
FIG. 2A is a side sectional view of a turbocharger-type supercharger.

FIG. 2A illustrates the internal structure of the turbocharger-type supercharger 19. The compressor portion 20 includes a compressor housing 25 and a compressor wheel 27 which is fixedly attached to a rotor shaft 26. The turbine portion 21 includes a turbine housing 28 and a turbine wheel 29 which is fixedly attached to the rotor shaft 26. The compressor housing 25 and the turbine housing 28 are connected via a center housing 30.

Figure 2B:
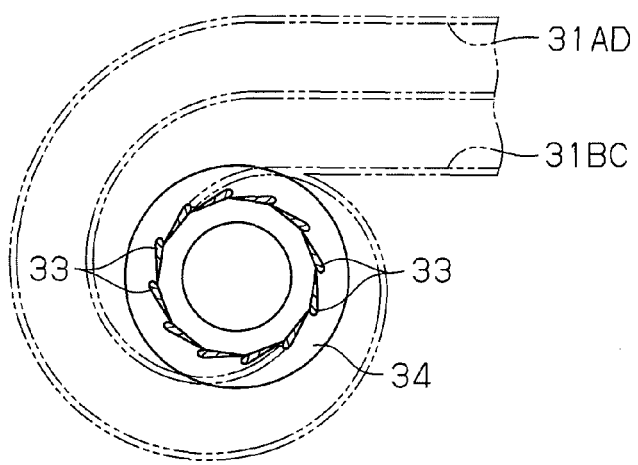
FIG. 2B is a sectional view taken along the line 2B-2B of FIG. 2A.

As illustrated in FIG. 2B, a pair of scroll passages 31AD and 31BC each serving as an exhaust gas introduction passage is provided in the turbine housing 28. The exhaust gas discharged from the cylinders 11A and 11D to the turbine portion 21 via the joining passage 23AD is fed into the scroll passage 31AD and a swirling passage 32 and is directed against blades 291 of the turbine wheel 29. The exhaust gas discharged from the cylinders 11B and 11C to the turbine portion 21 via the joining passage 23BC is fed into the scroll passage 31BC and the swirling passage 32 and is directed against the blades 291 of the turbine wheel 29. This allows the turbine wheel 29, the rotor shaft 26, and the compressor wheel 27 to rotate in an integrated manner.

The compressor wheel 27 introduces the air within the intake passage 17 on the upstream side of the compressor portion 20 into a compressor passage 251 provided in the compressor housing 25, and directs the air to the intake passage 17 downstream of the compressor portion 20.

A plurality of nozzle vanes 33 is disposed in the middle of the swirling passage 32. As illustrated in FIG. 2B, the nozzle vanes 33 are rotatably supported with a nozzle ring 34. The nozzle vanes 33 may change a sectional area of a flow passage between the adjacent nozzle vanes 33.

As illustrated in FIG. 2A, an arm 36 is fixedly attached to a spindle 35 which is rotatable with respect to the nozzle ring 34, and a unison ring 37 is inseparably engaged with the arm 36. A spindle 38 is rotatably supported on the center housing 30. A drive arm 39 is fixedly attached to one end of the spindle 38. The drive arm 39 is engaged with the unison ring 37. Rotation of the drive arm 39 about the spindle 38 allows the unison ring 37 to be rotated.

A drive lever 40, which is fixedly attached to the other end of the spindle 38, is rotated about the spindle 38 by an operation of a non-illustrated actuator. When the drive lever 40 is rotated, the drive arm 39 and the unison ring 37 rotate and the arm 36 and the nozzle vanes 33 rotate. That is, a vane opening degree is changed. An increase in the vane opening degree causes a decrease in turbine rotational speed, which results in a decrease in the flow rate of the air within the intake passage 17 on the downstream side of the compressor portion 20. A decrease in the vane opening degree causes an increase in turbine rotational speed, which results in an increase in the flow rate of the air within the intake passage 17 on the downstream side of the compressor portion 20.

As illustrated in FIG. 1, a bridge passage 41 is connected to the middle of the joining passage 23AD and to the middle of the joining passage 23BC. An electric first opening and closing valve V1 is provided in the middle of the bridge passage 41. The bridge passage 41 is connected with one end of an EGR passage 42 serving as a branch passage. The other end of the EGR passage 42 is connected to the intake passage 17. When the first opening and closing valve V1 is in a closed state, the communication between the joining passage 23AD and the joining passage 23BC via the bridge passage 41 is blocked. When the first opening and closing valve V1 is in an open state, the joining passage 23AD and the joining passage 23BC communicate with each other via the bridge passage 41. The first opening and closing valve V1 serves as a first opening and closing device that is provided to the bridge passage 41 to open and close the bridge passage 41.

An intercooler 46 and a throttle valve 47 are each provided in the middle of the intake passage 17. The intercooler 46 cools the air flowing within the intake passage 17. The throttle valve 47 regulates the flow rate of the air to be fed to the cylinders 11A, 11B, 11C, and 11D. The opening degree of the throttle valve 47 is controlled in accordance with depression of a non-illustrated accelerator pedal.

The opening degree of the throttle valve 47 is detected by a throttle opening detector 45. A rotation angle (crank angle) of a non-illustrated crank shaft is detected by a crank angle detector 48. Throttle opening degree detection information detected by the throttle opening detector 45 and crank angle detection information detected by the rank angle detector 48 are sent to a control computer C. The control computer C calculates and controls a fuel injection time (an injection start time and an injection end time) of the fuel injection nozzles 13 based on the throttle opening degree detection information and the crank angle detection information. The control computer C also calculates the rate of revolution N of the engine based on the crank angle detection information obtained by the crank angle detector 48. The control computer C also calculates engine load from the fuel injection time (or the amount of fuel injection) described above, for example.

The control computer C and the crank angle detector 48 configure a rate-of-revolution detection device that detects the rate of revolution of the internal combustion engine. The control computer C, the throttle opening detector 45, and the crank angle detector 48 configure a load detection device that detects load of the internal combustion engine.

The intake manifold 16 is provided with a pressure detector 44. The pressure detector 44 detects pressure within the intake manifold 16, i.e., supercharging pressure. Information regarding the supercharging pressure detected by the pressure detector 44 is provided to the control computer C.

The control computer C determines a target supercharging pressure from a preliminarily set map based on the rate of revolution of the engine, engine load, and the like. Further, the control computer C controls the vane opening degree of the turbine portion 21 of the turbocharger-type supercharger 19 so that the supercharging pressure detected by the pressure detector 44 reaches the target supercharging pressure.

A heat exchanger 43 is provided in the middle of the EGR passage 42. An electric second opening and closing valve V2 is provided in the middle of the EGR passage 42 on the downstream side of the heat exchanger 43. An electric third opening and closing valve V3 is provided in the middle of the EGR passage 42 on the upstream side of the heat exchanger 43. When the second opening and closing valve V2 is in the closed state, communication between the heat exchanger 43 and the intake passage 17 is blocked. When the second opening and closing valve V2 is in the open state, the heat exchanger 43 and the intake passage 17 communicate with each other via the EGR passage 42. When the third opening and closing valve V3 is in the closed state, communication between the heat exchanger 43 and the bridge passage 41 is blocked. When the third opening and closing valve V3 is in the open state, the heat exchanger 43 and the joining passage 23AD communicate with each other via the EGR passage 42 and the bridge passage 41.

The second opening and closing valve V2 serves as a second opening and closing device that is provided downstream of the heat exchanger 43 in the EGR passage 42 to open and close the EGR passage 42. The third opening and closing valve V3 serves as a third opening and closing device that is upstream of the heat exchanger 43 to open and close the EGR passage 42.

The control computer C controls opening and closing of the first opening and closing valve V1, the second opening and closing valve V2, and the third opening and closing valve V3.

Figure 3:
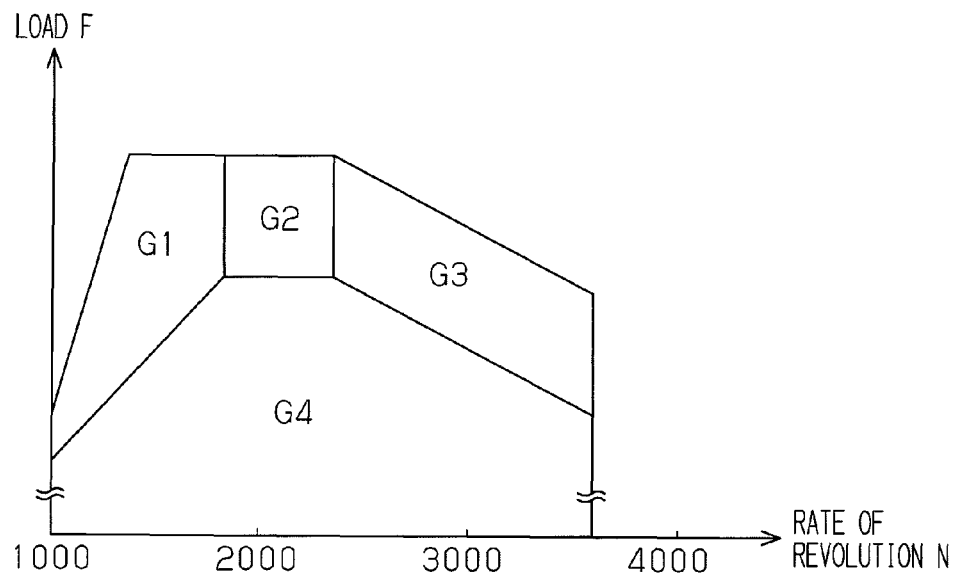
FIG. 3 is a region graph represented by the rate of revolution of an engine and engine load.

FIG. 3 is a region graph represented by the rate of revolution N of the engine and engine load F. A region G1 is a region where it is desirable that a turbine driving force in the turbocharger-type supercharger 19 is increased when the rate of revolution N of the engine is low. A region G2 is a region where it is desirable that the turbine driving force in the turbocharger-type supercharger 19 is increased while preventing the pressure within each of the cylinders 11A, 11B, 11C, and 11D from exceeding allowable maximum pressure. A region G3 is a region where it is desirable that the turbine driving force in the turbocharger-type supercharger 19 is increased while preventing a peak value of an exhaust pulse from exceeding an allowable maximum value. A region G4 is a region where it is desirable that exhaust gas is sent to the EGR passage 42 to thereby clean the exhaust gas.

The region G4 is a low load region. The region G1 is a low-revolution-rate high-load region with a higher load and a lower rate of revolution than those of the low-load region G4. The region G2 is an intermediate-revolution-rate high-load region with a load higher than that of the low-load region G4 and with a higher rate of revolution than that of the low-revolution-rate high-load region G1. The region G3 is a high-revolution-rate high-load region with a load higher than that of the low-load region G4 and with a higher rate of revolution than that of the intermediate-revolution-rate high-load region G2.

Figure 4:
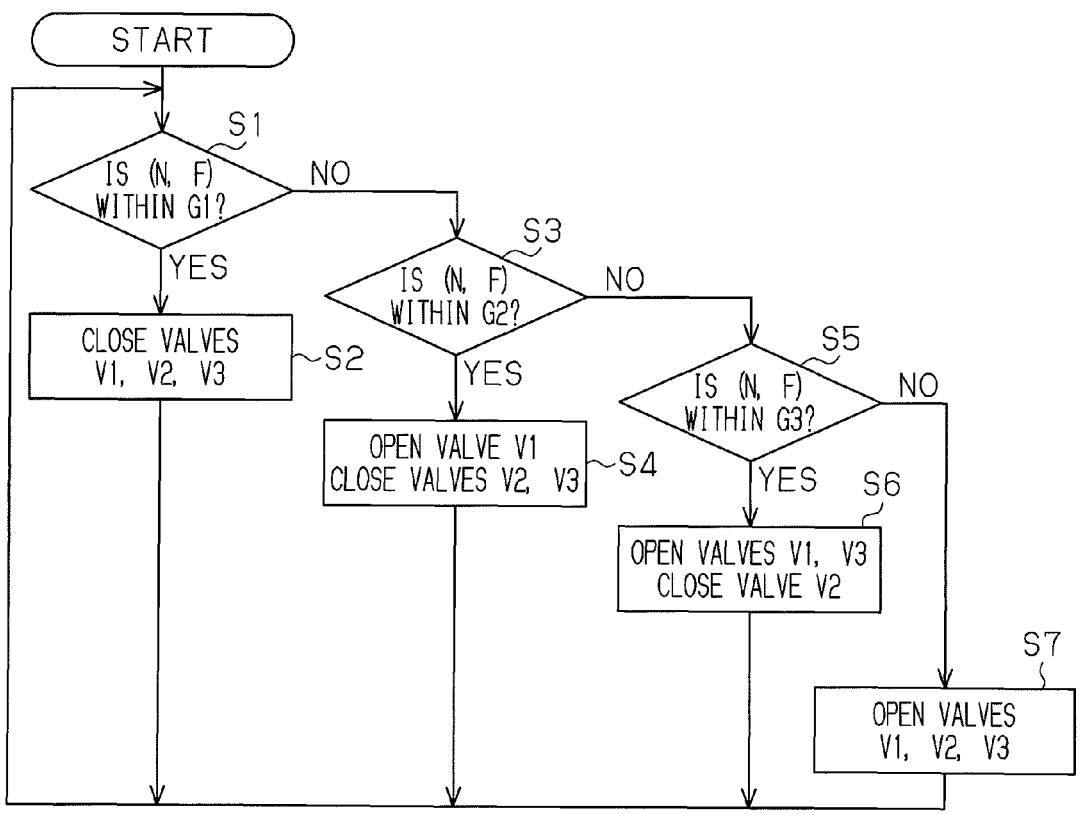
FIG. 4 is a flowchart illustrating an opening and closing control program.

FIG. 4 is a flowchart illustrating an opening and closing control program for controlling opening and closing of the first opening and closing valve V1, the second opening and closing valve V2, and the third opening and closing valve V3. Hereinafter, a control for opening and closing the first opening and closing valve V1, the second opening and closing valve V2, and the third opening and closing valve V3 will be described with reference to this flowchart.

The control computer C judges if a pair (N, F) of the calculated rate of revolution N of the engine and the calculated engine load F is present in the low-revolution-rate high-load region G1 (step S1). When the pair (N, F) is present in the low-revolution-rate high-load region G1 (YES in step S1), the control computer C controls all of the first opening and closing valve V1, the second opening and closing valve V2, and the third opening and closing valve V3 to be brought into the closed state (step S2). This control enables a large turbine driving force even when the rate of revolutions N of the engine is low, while preventing the exhaust gas within the joining passages 23AD and 23BC from being sent to the intake passage 17 via the bridge passage 41, the EGR passage 42, and the heat exchanger 43.

In step S1, when the pair (N, F) is not present in the low-revolution-rate high-load region G1, the control computer C judges if the pair (N, F) is present in the intermediate-revolution-rate high-load region G2 (step S3). When the pair (N, F) is present in the intermediate-revolution-rate high-load region G2 (YES in step S3), the control computer C controls the first opening and closing valve V1 to be brought into the open state and controls the second opening and closing valve V2 and the third opening and closing valve V3 to be brought into the closed state (step S4). This control allows the joining passage 23AD and the joining passage 23BC to communicate with each other via the bridge passage 41, while preventing the exhaust gas within the bridge passage 41 from being directed to the intake passage 17 via the EGR passage 42 and the heat exchanger 43. In this state, a large turbine driving force can be obtained, while preventing the pressure within each of the cylinders 11A, 11B, 11C, and 11D from exceeding the allowable maximum pressure.

In step S3, when the pair (N, F) is not present in the intermediate-revolution-rate high-load region G2, the control computer C judges if the pair (N, F) is present in the high-revolution-rate high-load region G3 (step S5). When the pair (N, F) is present in the high-revolution-rate high-load region G3 (YES in step S5), the control computer C controls the first opening and closing valve V1 and the third opening and closing valve V3 to be brought into the open state, and controls the second opening and closing valve V2 to be brought into the closed state (step S6). This control allows the joining passage 23AD and the joining passage 23BC to communicate with each other via the bridge passage 41 and allows the heat exchanger 43 to communicate with the bridge passage 41 via the EGR passage 42, while preventing the exhaust gas within the bridge passage 41 from being sent to the intake passage 17 via the EGR passage 42. In this state, a large turbine driving force can be obtained, while preventing the peak value of the exhaust pulse from exceeding the allowable maximum value.

In step S5, when the pair (N, F) is not present in the high-revolution-rate high-load region G3, i.e., when the pair (N, F) is present in the low-load region G4, the control computer C controls all of the first opening and closing valve V1, the second opening and closing valve V2, and the third opening and closing valve V3 to be brought into the open state (step S7). This control allows the joining passage 23AD and the joining passage 23BC to communicate with each other via the bridge passage 41, and allows the intake passage 17 to communicate with the bridge passage 41 via the EGR passage 42. Accordingly, the exhaust gas within the bridge passage 41 is directed to the intake passage 17 via the EGR passage 42, and the exhaust gas is cleaned using recirculation of the exhaust gas.

The control computer C is a control device that controls opening and closing of the first opening and closing valve V1, the second opening and closing valve V2, and the third opening and closing valve V3 in accordance with the rate of revolution N detected by the rate-of-revolution detection device and the load F detected by the load detection device.

Figure 7:
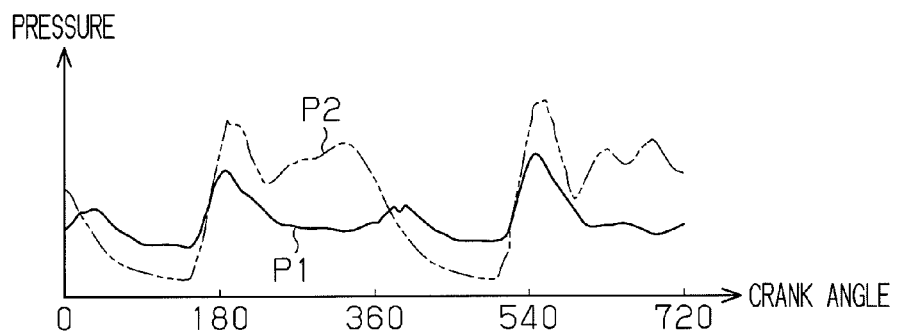
FIG. 7 is a graph illustrating pressure fluctuation in a connecting passage.

A curve P1 in the graph of FIG. 7 represents pressure fluctuation in the joining passage 23AD when the rate of revolution N of the engine is high (for example, 3600 rpm) and when the first opening and closing valve V1 is in the open state. The abscissa axis represents crank angle, and the ordinate axis represents pressure. A curve P2 represents pressure fluctuation in the joining passage 23AD when the rate of revolution N of the engine is high as described above, and when the first opening and closing valve V1 is in the closed state. When the first opening and closing valve V1 is in the closed state, the maximum value of the exhaust pulse is excessively large. On the other hand, when the first opening and closing valve V1 is brought into the open state, the maximum value of the exhaust pulse can be lowered to be less than compressive strength of exhaust parts (for example, a sealing structure of the exhaust system).

Step S4 in the flowchart is a control step of opening only the first opening and closing valve V1 to lower the maximum value of the exhaust pulse to be less than the compressive strength. As a result, in the intermediate-revolution-rate high-load region G2 in which the rate of revolution N of the engine is intermediate, a large turbine driving force can be obtained, while preventing the pressure within each of the cylinders 11A, 11B, 11C, and 11D from exceeding the allowable maximum pressure.

On the contrary, the low-revolution-rate high-load region G1 is a region where the rate of revolution N of the engine is low is a region where it is desirable that the maximum value of the exhaust pulse is set to be approximate to the compressive strength of the exhaust parts (for example, sealing structure of an exhaust system) to thereby increase the turbine driving force. Step S2 in the flowchart is a control step therefor. This enables a large turbine driving force also in the low-revolution-rate high-load region G1 in which the rate of revolution N of the engine is low.

When the sectional area of the bridge passage 41 is small in the high-revolution-rate high-load region G3 in which the rate of revolution N of the engine is high, there is a possibility that the maximum value of the exhaust pulse cannot be set to be less than the compressive strength with opening only the first opening and closing valve V1.

Figure 5A:
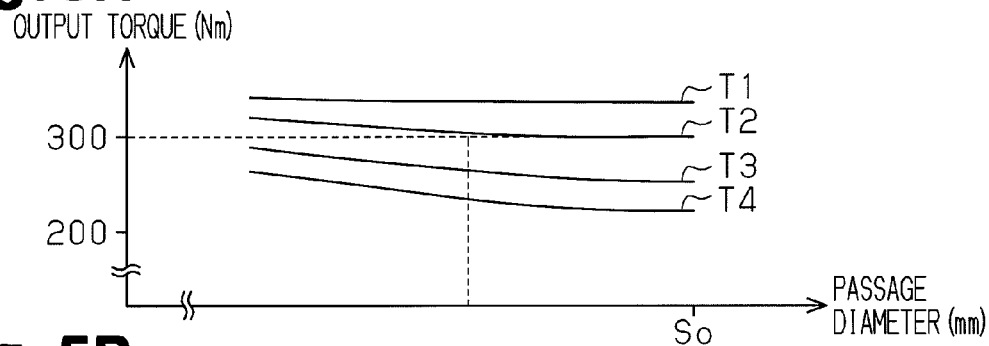
FIG. 5A is a graph illustrating a relation between passage diameter and output torque.

Each of curves T1, T2, T3, and T4 in the graph illustrated in FIG. 5A represents a change in output torque when the joining passage 23AD and the joining passage 23BC communicate with each other via the bridge passage 41 and when the heat exchanger 43 communicates with the bridge passage 41 via the EGR passage 42. The axis of abscissa represents the passage diameter of the bridge passage 41, and the axis of ordinate represents an output torque. The curve T1 represents a change in output torque when a vane opening degree ratio in the turbocharger-type supercharger 19 is 50%. The curve T2 represents a change in output torque when the vane opening degree ratio in the turbocharger-type supercharger 19 is 60%. The curve T3 represents a change in output torque when the vane opening degree ratio in the turbocharger-type supercharger 19 is 70%. The curve T4 represents a change in output torque when the vane opening degree ratio in the turbocharger-type supercharger 19 is 80%.

Figure 5B:
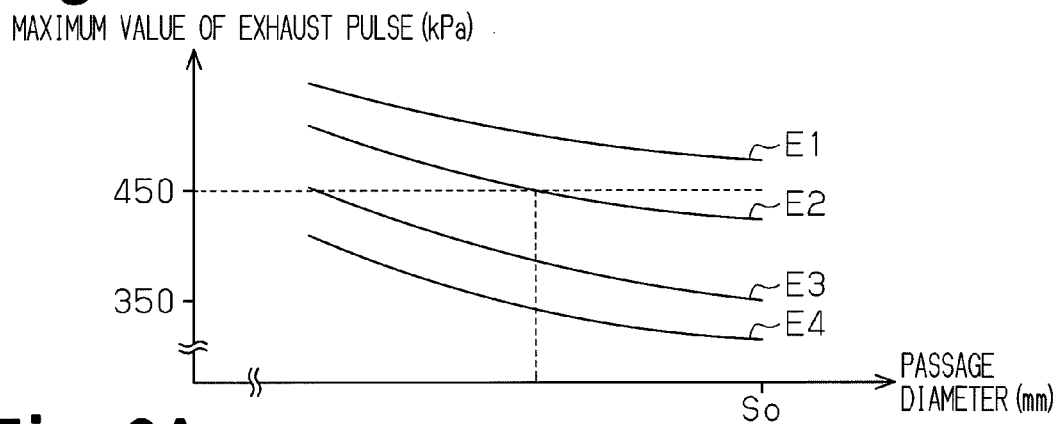
FIG. 5B is a graph illustrating a relation between passage diameter and maximum value of an exhaust pulse.

Each of curves E1, E2, E3, and E4 in the graph illustrated in FIG. 5B represents a change in maximum value of the exhaust pulse when the joining passage 23AD and the joining passage 23BC communicate with each other via the bridge passage 41 and when the heat exchanger 43 communicates with the bridge passage 41 via the EGR passage 42. The abscissa axis represents the passage diameter of the bridge passage 41, and the ordinate axis represents the maximum value of the exhaust pulse. The curve E1 represents change in maximum value of the exhaust pulse when the vane opening degree ratio in the turbocharger-type supercharger 19 is 50%. The curve E2 represents change in maximum value of the exhaust pulse when the vane opening degree ratio in the turbocharger-type supercharger 19 is 60%. The curve E3 represents a change in maximum value of the exhaust pulse when the vane opening degree ratio in the turbocharger-type supercharger 19 is 70%. The curve E4 represents a change in maximum value of the exhaust pulse when the vane opening degree ratio in the turbocharger-type supercharger 19 is 80%.

FIGS. 5A and 5B each illustrate the case where the rate of revolution of the engine is high (for example, 3600 rpm). A passage diameter So represents the passage diameter of the bridge passage 41.

In this embodiment, assuming that a minimum value of a required output torque is 300 Nm and an allowable maximum value of an exhaust pulse is 450 kPa when the vane opening degree ratio is 60%, when the passage diameter So of the bridge passage 41 is set to a necessary value, the minimum value of the output torque can be obtained and the maximum value of the exhaust pulse can be set to be equal to or lower than the allowable value.

Figure 6A:
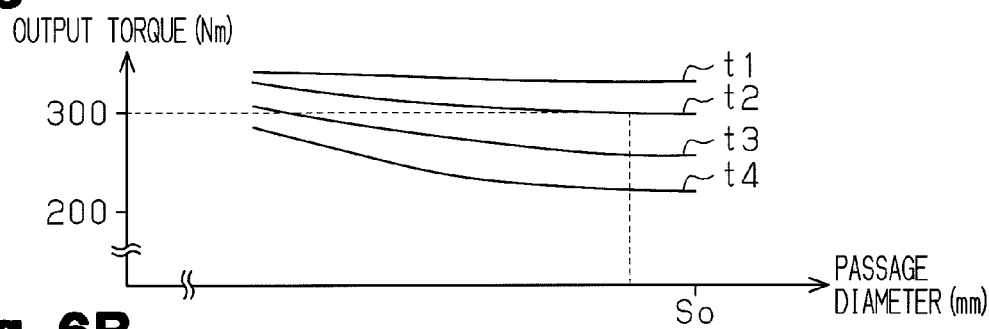
FIG. 6A is a graph illustrating a relation between passage diameter and output torque.

On the other hand, each of curves t1, t2, t3, and t4 in the graph illustrated in FIG. 6A represents a change in output torque when the joining passage 23AD and the joining passage 23BC communicate with each other via the bridge passage 41, while the heat exchanger 43 does not communicate with the bridge passage 41 via the EGR passage 42. The abscissa axis represents the passage diameter of the bridge passage 41, and the ordinate axis represents an output torque. The curve t1 represents a change in output torque when the vane opening degree ratio in the turbocharger-type supercharger 19 is 50%. The curve t2 represents a change in output torque when the vane opening degree ratio in the turbocharger-type supercharger 19 is 60%. The curve t3 represents a change in output torque when the vane opening degree ratio in the turbocharger-type supercharger 19 is 70%. The curve t4 represents a change in output torque when the vane opening degree ratio in the turbocharger-type supercharger 19 is 80%.

Figure 6B:
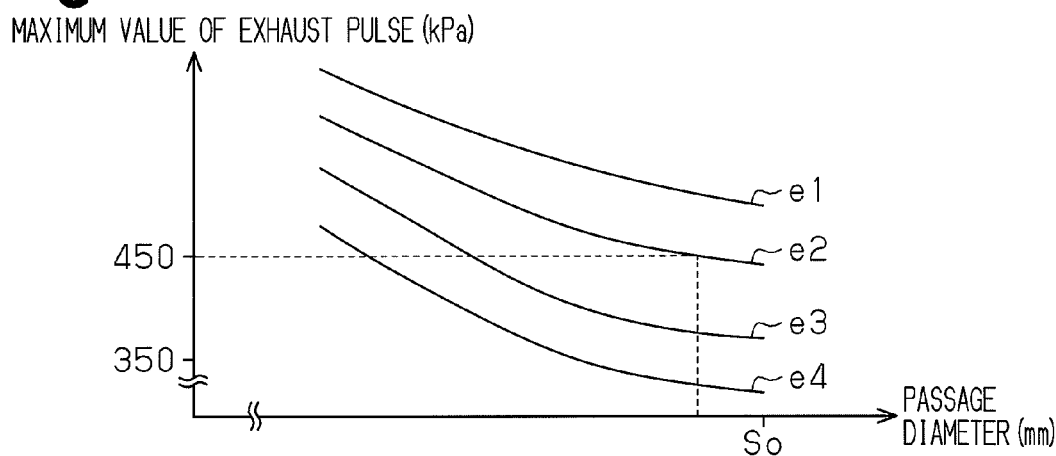
FIG. 6B is a graph illustrating a relation between passage diameter and maximum value of an exhaust pulse.

Each of curves e1, e2, e3, and e4 in the graph illustrated in FIG. 6B represents a change in maximum value of the exhaust pulse when the joining passage 23AD and the joining passage 23BC communicate with each other via the bridge passage 41, while the heat exchanger 43 does not communicate with the bridge passage 41 via the EGR passage 42. The abscissa axis represents the passage diameter of the bridge passage 41, and the ordinate axis represents the maximum value of the exhaust pulse. The curve e1 represents a change in maximum value of the exhaust pulse when the vane opening degree ratio in the turbocharger-type supercharger 19 is 50%. The curve e2 represents a change in maximum value of the exhaust pulse when the vane opening degree ratio in the turbocharger-type supercharger 19 is 60%. The curve e3 represents a change in maximum value of the exhaust pulse when the vane opening degree ratio in the turbocharger-type supercharger 19 is 70%. The curve e4 represents a change in maximum value of the exhaust pulse when the vane opening degree ratio in the turbocharger-type supercharger 19 is 80%.

In both FIGS. 6A and 6B, the rate of revolution of the engine is high (for example, 3600 rpm). The passage diameter So represents the passage diameter of the bridge passage 41.

In the case of FIGS. 6A and 6B, if the passage diameter So of the bridge passage 41 is set larger than when the heat exchanger 43 communicate with the bridge passage 41 via the EGR passage 42, the minimum value of the output torque can be obtained. Furthermore, the maximum value of the exhaust pulse can be set to be equal to or lower than the allowable value.

The difference between the case of FIGS. 5A and 5B and the case of FIGS. 6A and 6B resides in whether the passage volume of the heat exchanger 43 is used or not.

Step S6 in the flowchart is a control step of opening not only the first opening and closing valve V1 but also the third opening and closing valve V3 to thereby set the maximum value of the exhaust pulse to be less than the compressive strength. When the third opening and closing valve V3 is brought into the open state, the heat exchanger 43 communicates with the bridge passage 41 via the EGR passage 42, and the passage volume in the heat exchanger 43 is used to lower the maximum value of the exhaust pulse. As a result, even when the passage diameter of the bridge passage 41 is small, the maximum value of the exhaust pulse can be lowered and a large turbine driving force can be obtained in the high-revolution-rate high-load region G3.

The low-load region G4 in which recirculation of the exhaust gas is carried out is a region where it is desirable that recirculation of the exhaust gas is carried out to clean the exhaust gas. However, there is a possibility that the air within the intake passage 17 backflows into the EGR passage 42.

Figure 8A:
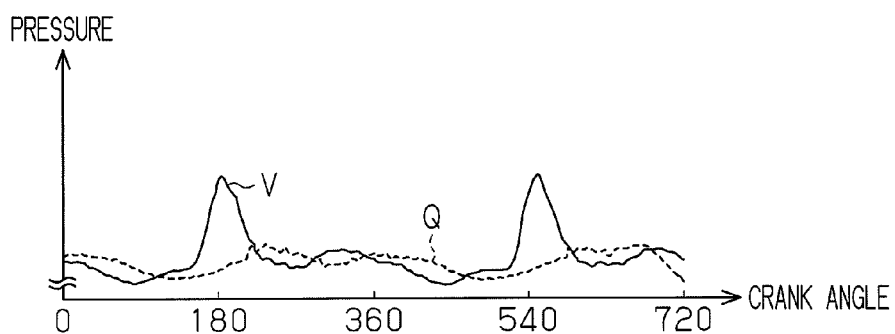
FIG. 8A is a graph illustrating change in pressures within an intake passage and an EGR passage.

Curve Q in the graph illustrated in FIG. 8A represents pressure within the intake passage 17 on the downstream side of the intercooler 46 when the exhaust gas is sent only from the joining passage 23AD to the EGR passage 42 and the intake passage 17. The abscissa axis represents crank angle, and the ordinate axis represents pressure. A curve V represents a change in the pressure within the EGR passage 42 on the downstream side of the heat exchanger 43 when the exhaust gas is sent only from the joining passage 23AD to the EGR passage 42 and the intake passage 17. As indicated by the curve Q, the pressure within the intake passage 17 may become higher than the pressure within the EGR passage 42 on the downstream side of the heat exchanger 43. In such a case, the air within the intake passage 17 backflows into the EGR passage 42.

Figure 8B:
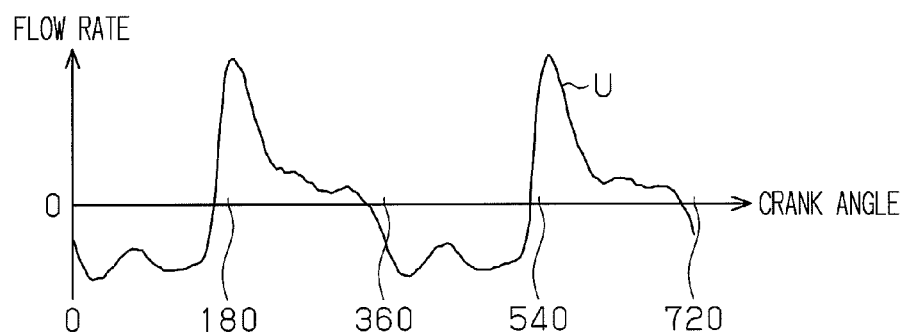
FIG. 8B is a graph illustrating change in fluid flow rate within the EGR passage.
Figure 8C:
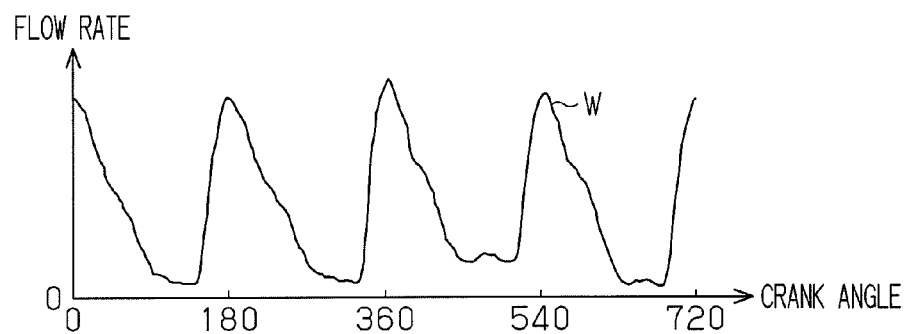
FIG. 8C is a graph illustrating change in fluid flow rate within the EGR passage.

The curve U in the graph illustrated in FIG. 8B represents change in fluid flow rate (units of kg/s) of the EGR passage 42 on the downstream side of the heat exchanger 43. The abscissa axis represents crank angle, and the ordinate axis represents fluid flow rate. The curve U represents change in fluid flow rate of the exhaust gas in the case corresponding to the curve Q illustrated in FIG. 8A (i.e., when the exhaust gas is provided only from the joining passage 23AD to the EGR passage 42 and the intake passage 17). The curve U below the abscissa axis represents backflow of the air within the intake passage 17 to the EGR passage 42.

Step S7 in the flowchart is a control step of opening all of the first opening and closing valve V1, the second opening and closing valve V2, and the third opening and closing valve V3, to provide the exhaust gas from both the joining passages 23AD and 23BC to the EGR passage 42 and the intake passage 17. This control prevents backflow from the intake passage 17 to the EGR passage 42 as indicated by the curve W in the graph illustrated in FIG. 8C. That is, step S7 is a control step for preventing backflow from the intake passage 17 to the EGR passage 42.

The first embodiment has the following effects.

(1) By closing the second opening and closing valve V2 and opening the first opening and closing valve V1 and the third opening and closing valve V3, the passage volume in the heat exchanger 43 can be used to reduce the maximum value of the exhaust pulse. As a result, even when the passage diameter of the bridge passage 41 is small, the maximum value of the exhaust pulse can be lowered and a large turbine driving force can be obtained. Accordingly, the first opening and closing valve V1 can be downsized.

(2) When the third opening and closing valve V3 is omitted, in the state where the second opening and closing valve V2 is closed and the first opening and closing valve V1 is opened, the passage volume within the heat exchanger 43 is constantly used to reduce the maximum value of the exhaust pulse. While such control is possible, the presence of the third opening and closing valve V3 allows finer control of the turbine driving force in accordance with the rate of revolution N of the internal combustion engine and the load F, as in the case where the internal combustion engine is present in the intermediate-revolution-rate high-load region G2, for example.

Figure 9:
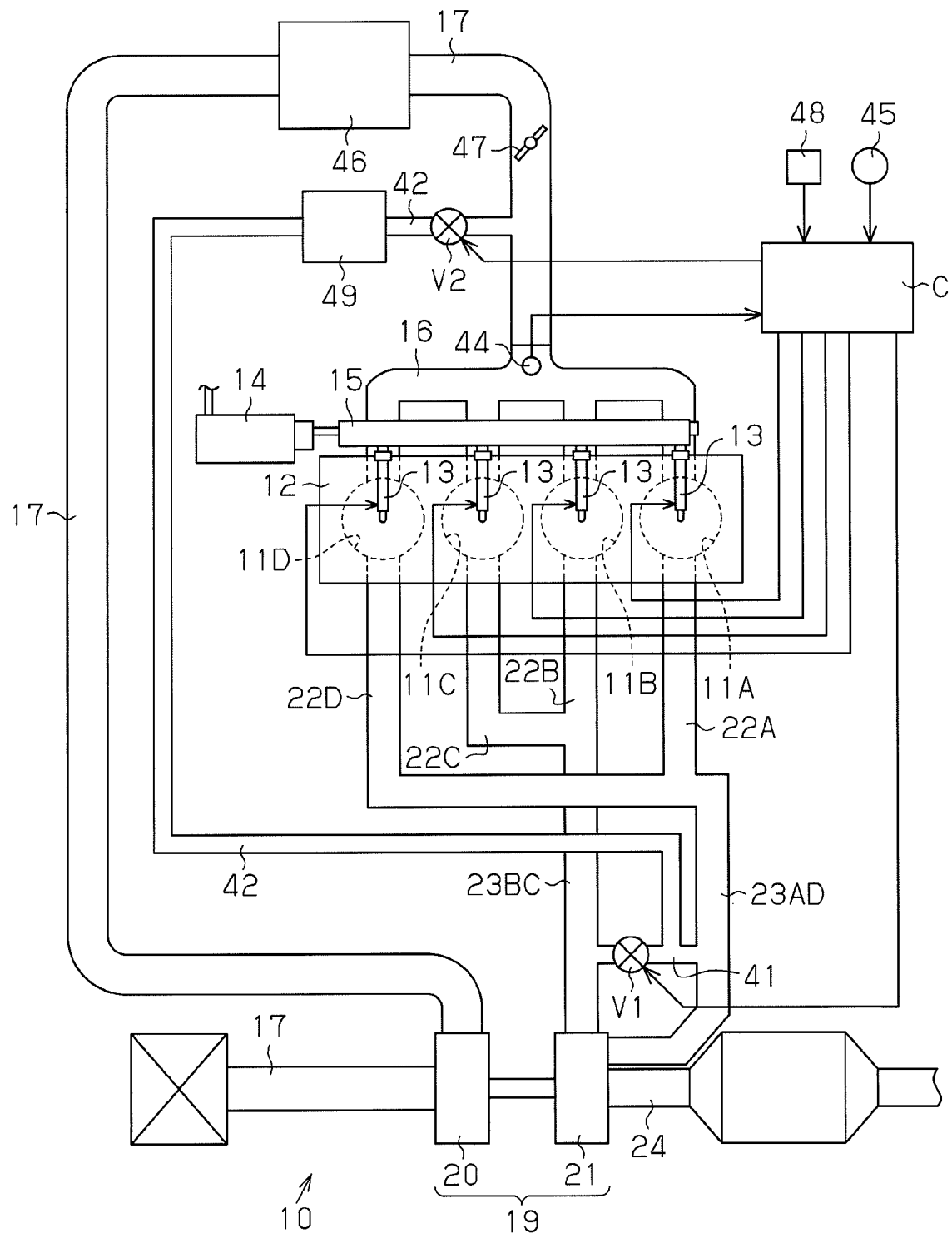
FIG. 9 is an overall structural diagram of an internal combustion engine illustrating a second embodiment.
Figure 10:
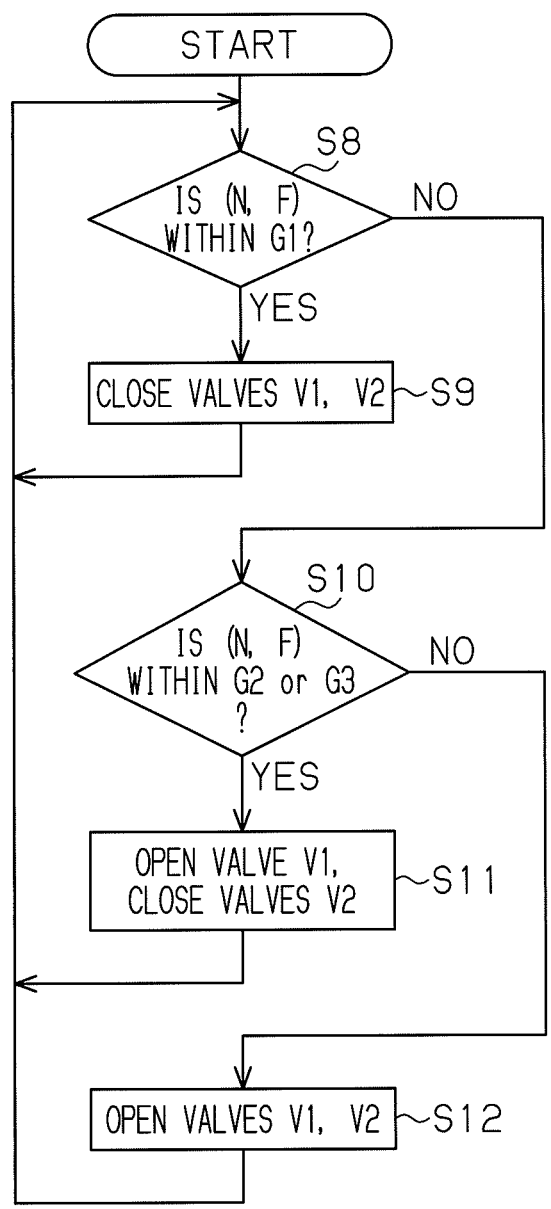
FIG. 10 is a flowchart illustrating an opening and closing control program.

Next, a second embodiment will be described with reference to FIGS. 9 and 10. The same components as those of the first embodiment are denoted by the same reference numerals, and the detailed description thereof is omitted.

In the second embodiment, the third opening and closing valve V3 of the first embodiment is omitted. In this case, the control of opening and closing the first opening and closing valve V1 and the second opening and closing valve V2 is carried out as in steps S8, S9, S10, S11, and S12 in the flowchart of FIG. 10. The control computer C is a control device that controls opening and closing of the first opening and closing valve V1 and the second opening and closing valve V2 in accordance with the rate of revolution N detected by the rate-of-revolution detection device and the load F detected by the load detection device.

Even when the third opening and closing valve V3 is omitted, the same effects as those described in the item (1) of the first embodiment can be obtained.

Next, a third embodiment will be described with reference to FIGS. 11A, 11B, 11C, and 11D. The same components as those of the first embodiment are denoted by the same reference numerals, and the detailed description thereof is omitted.

Figure 11A:
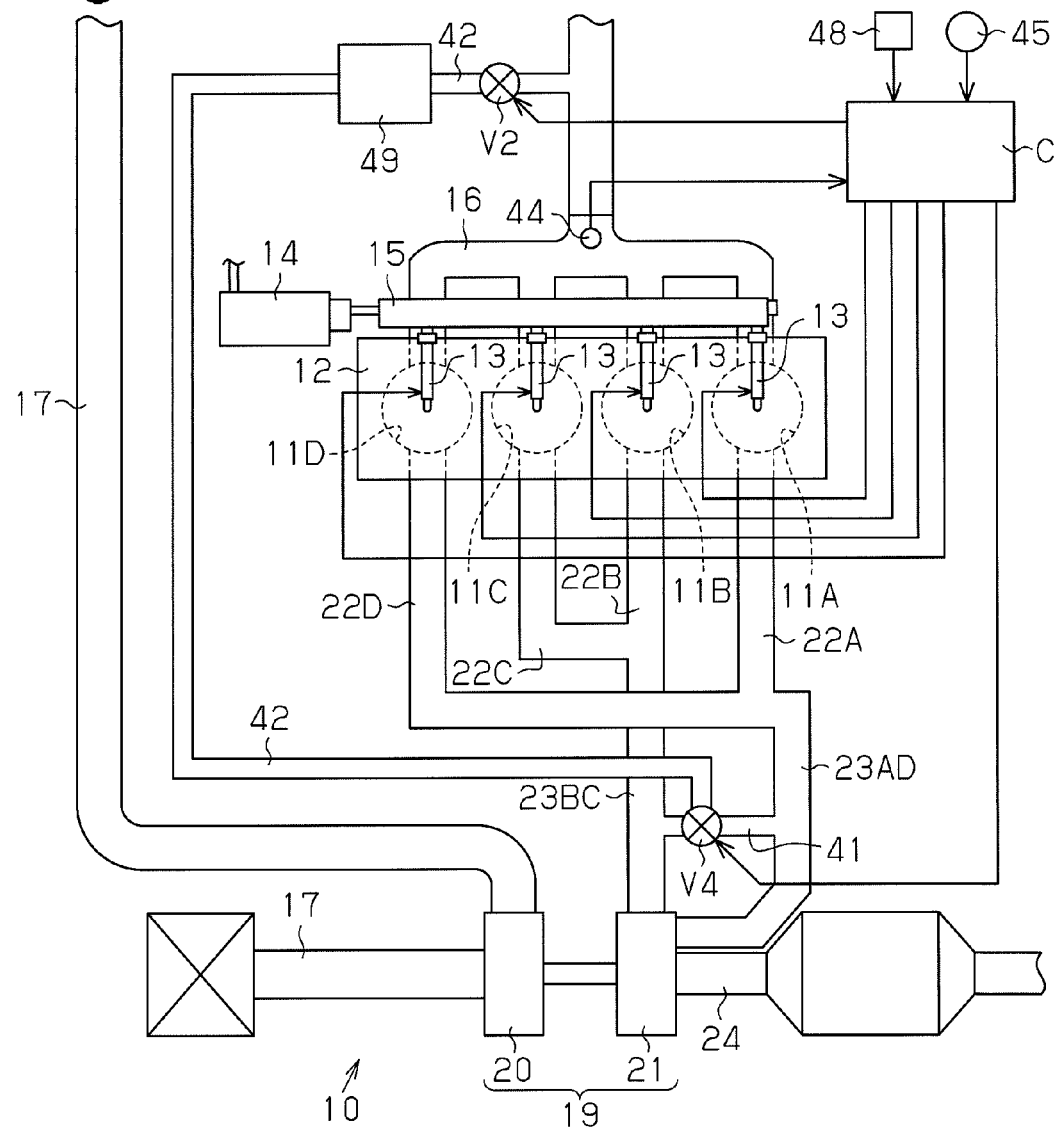
FIG. 11A is an overall structural view of an internal combustion engine illustrating a third embodiment.
Figure 11B:
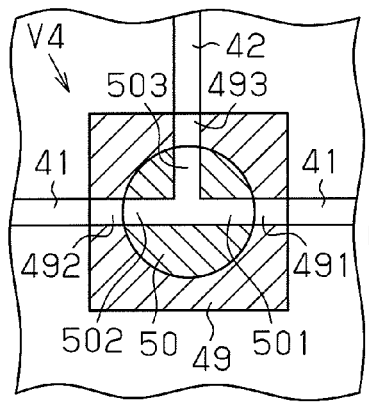
FIG. 11B is a sectional view illustrating an internal structure of a three-way valve V4.

As illustrated in FIG. 11A, an electric three-way valve V4 is provided in the bridge passage 41. The rotational position of the three-way valve V4 is controlled by the control computer C. As illustrated in FIG. 11B, the three-way valve V4 includes a rotation valve body 50 in a valve housing 49, and three ports 501, 502, and 503 are provided in the rotation valve body 50 so as to communicate with one another. Three valve holes 491, 492, and 493 are provided in the valve housing 49. The valve hole 491 communicates with the joining passage 23AD via the bridge passage 41, and the valve hole 492 communicates with the joining passage 23BC via the bridge passage 41. The valve hole 493 communicates with the EGR passage 42.

Figure 11C:
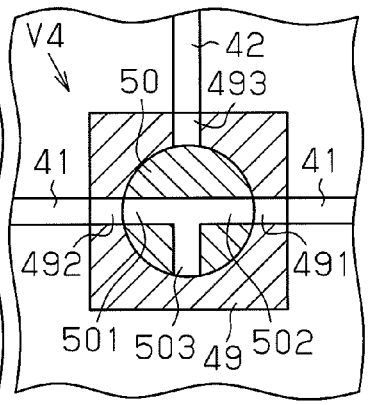
FIG. 11C is a sectional view illustrating the internal structure of the three-way valve V4.
Figure 11D:
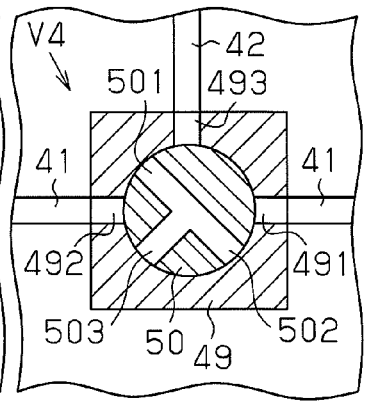
FIG. 11D is a sectional view illustrating the internal structure of the three-way valve V4.

When the pair of the rate of revolution N of the engine and the engine load F is present in the low-revolution-rate high-load region G1 (see FIG. 3), the three-way valve V4 is controlled to be brought into the state illustrated in FIG. 11D, and the second opening and closing valve V2 is controlled to be brought into the closed state. In this state, the communication between the joining passage 23AD and the joining passage 23BC via the bridge passage 41 is blocked, as in step S2 of the flowchart of FIG. 4.

When the pair of the rate of revolution N of the engine and the engine load F is present in the intermediate-revolution-rate high-load region G2 (see FIG. 3), the three-way valve V4 is controlled to be brought into the state illustrated in FIG. 11C, and the second opening and closing valve V2 is controlled to be brought into the closed state. In this state, the joining passage 23AD and the joining passage 23BC communicate with each other via the bridge passage 41, while the communication between the EGR passage 42 and the bridge passage 41 is blocked, as in step S4 of the flowchart of FIG. 4.

When the pair of the rate of revolution N of the engine and the engine load F is present in the high-revolution-rate high-load region G3 (see FIG. 3), the three-way valve V4 is controlled to be brought into the state illustrated in FIG. 11B, and the second opening and closing valve V2 is controlled to be brought into the closed state. In this state, the joining passage 23AD and the joining passage 23BC communicate with each other via the bridge passage 41, and the heat exchanger 43 communicates with the bridge passage 41 via the EGR passage 42, as in step S6 of the flowchart of FIG. 4.

When the pair of the rate of revolution N of the engine and the engine load F is present in the low-load region G4 (see FIG. 3), the three-way valve V4 is controlled to be brought into the state illustrated in FIG. 11B, and the second opening and closing valve V2 is controlled to be brought into the open state. In this state, the joining passage 23AD and the joining passage 23BC communicate with each other via the bridge passage 41, and the bridge passage 41 and the intake passage 17 communicate with each other via the EGR passage 42, as in step S7 of the flowchart of FIG. 4.

The three-way valve V4 is a single switch valve that switches communication and blocking between the EGR passage 42 and the bridge passage 41 on the upstream side of the heat exchanger 43, and that switches opening and closing of the bridge passage 41. The EGR passage 42 and the bridge passage 41 on the upstream side of the heat exchanger 43 are connected via the three-way valve V4. That is, the three-way valve V4, which is a switch valve, serves as the first opening and closing device and the third opening and closing device. Use of such a three-way valve V4 having combined configuration contributes to simplification of the piping configuration of the exhaust gas passage.

In the present invention, the following embodiments can also be implemented.

In the first embodiment, one of the exhaust passages 22A and 22D configuring the first connecting passage and one of the exhaust passages 22B and 22C configuring the second connecting passage may be connected to each other with a bridge passage.

The present invention can be applied to a six-cylinder engine disclosed in Patent Document 1, or a V-shaped eight-cylinder engine.

For example, cylinders in the six-cylinder engine may be divided into three groups, and each connecting passage may be guided to a turbocharger-type supercharger from each group. In this case, each connecting passage is connected to the corresponding bridge passage in the middle of each connecting passage, and each bridge passage is provided with the first opening and closing device.

Two or more of a plurality of connecting passages for connecting a plurality of exhaust gas introduction passages with a plurality of cylinders in one-to-one correspondence may be connected to each other via a bridge passage.

In an internal combustion engine with no EGR passage, the exhaust passage 24 and the bridge passage 41 on the downstream side of the turbine portion 21 may be connected together via a branch passage, and the third opening and closing device may be provided on the branch passage.

The present invention can also be applied to a gasoline engine.

What is claimed is:

1. An internal combustion engine with a supercharger comprising:
    a plurality of cylinders disposed in the internal combustion engine;
    an intake passage that supplies gas to the internal combustion engine;
    the supercharger including a turbine portion having a plurality of exhaust gas introduction passages; and
    an exhaust gas passage configured to guide exhaust gas discharged from the internal combustion engine to the plurality of exhaust gas introduction passages of the turbine portion;
    wherein the exhaust gas passage includes a plurality of exhaust passages and a first joining passage and a second joining passage, and
    wherein each of the first joining passage and the second joining passage connects with exhaust passages of the plurality of exhaust passages that are further connected to respective ones of the plurality of cylinders, and the first joining passage and the second joining passage respectively are connected to the plurality of exhaust gas introduction passages of the turbine portion,
    the internal combustion engine further comprising:
    a bridge passage that connects the first joining passage to the second joining passage;
    a first opening and closing valve provided in the bridge passage to open and close the bridge passage;
    a branch passage having one end connected to the bridge passage provided between the first opening and closing valve and the first joining passage and the other end of the branch passage connected to the intake passage of the internal combustion engine, wherein the branch passage serves as an EGR passage;
    a heat exchanger provided on the EGR passage to cool exhaust gas flowing through the EGR passage;
    a second opening and closing valve provided downstream of the heat exchanger in the EGR passage to open and close the EGR passage, the second opening and closing valve being in further communication with the intake passage of the internal combustion engine; and
    a third opening and closing valve provided in the EGR passage to open and close the EGR passage upstream of the heat exchanger;
    a rate-of-revolution detection device that detects the rate of revolution of the internal combustion engine;
    a load detection device that detects load of the internal combustion engine; and
    a control device that controls opening and closing of the second opening and closing valve, the first opening and closing valve, and the third opening and closing valve,
    wherein the first opening and closing valve and the second opening and closing valve and the third opening and closing valve are configured to operate in a manner so as to selectively allow the exhaust gas to be directed from the bridge passage to the intake passage through the EGR passage;
    wherein the control device controls opening and closing of the first opening and closing valve, the second opening and closing valve, and the third opening and closing valve in accordance with the rate of revolution detected by the rate-of-revolution detection device and the load detected by the load detection device; and
    wherein one or more of the rate-of-revolution detection device, the load detection device and the control device are implemented via a control computer.

2. The internal combustion engine with the supercharger according to claim 1, wherein
    the control device opens all of the first opening and closing valve, the second opening and closing valve, and the third opening and closing valve in a low load region,
    the control device closes all of the first opening and closing valve, the second opening and closing valve, and the third opening and closing valve in a low-revolution-rate high-load region with a load higher than that of the low load region and with low revolution rate,
    the control device opens the first opening and closing valve and closes the second opening and closing valve and the third opening and closing valve in an intermediate-revolution-rate high-load region with a load higher than that of the low load region and with a higher rate of revolution than that of the low-revolution-rate high-load region, and
    the control device opens the first opening and closing valve and the third opening and closing valve and closes the second opening and closing valve in a high-revolution high-load region with a load higher than that of the low load region and with a higher rate of revolution than that of the intermediate-revolution-rate high-load region.

* * * * *